US008664947B2

(12) United States Patent
Storrie et al.

(10) Patent No.: US 8,664,947 B2
(45) Date of Patent: Mar. 4, 2014

(54) ACTUATOR AND SENSOR ASSEMBLY

(75) Inventors: William D. Storrie, Motherwell (GB); Robert L. Newman, Edwardsburg, MI (US); Brian G. Babin, Bristol, IN (US); Kevin C. Wolschlager, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 446 days.

(21) Appl. No.: 12/962,773

(22) Filed: Dec. 8, 2010

(65) Prior Publication Data

US 2011/0079138 A1 Apr. 7, 2011

Related U.S. Application Data

(63) Continuation-in-part of application No. 12/315,332, filed on Dec. 2, 2008, now Pat. No. 8,395,374, and a continuation-in-part of application No. 12/592,170, filed on Nov. 20, 2009.

(60) Provisional application No. 61/284,027, filed on Dec. 9, 2009, provisional application No. 61/284,028, filed on Dec. 9, 2009, provisional application No. 61/340,813, filed on Mar. 22, 2010.

(51) Int. Cl.
*G01B 7/14* (2006.01)
(52) U.S. Cl.
USPC ..................................... 324/207.24
(58) Field of Classification Search
USPC ..................................... 324/207.24
See application file for complete search history.

(56) References Cited

U.S. PATENT DOCUMENTS

| 2,134,072 A | 10/1938 | Christensen |
| 2,355,721 A | 8/1944 | Foutz |
| 2,478,575 A | 8/1949 | Fitch |
| 2,738,808 A | 3/1956 | Hartzell et al. |
| 2,849,091 A | 8/1958 | Newell |
| 2,939,486 A | 6/1960 | Demay |
| 2,976,686 A | 3/1961 | Stelzer |
| 3,082,792 A | 3/1963 | Jenkins et al. |

(Continued)

FOREIGN PATENT DOCUMENTS

| CA | 2635228 | 6/2007 |
| DE | 7424147 | 10/1974 |

(Continued)

OTHER PUBLICATIONS

CTS Corporation, EGR history with poti sensors (2011), 7 pages, Elkhart, Indiana.

(Continued)

*Primary Examiner* — Reena Aurora
(74) *Attorney, Agent, or Firm* — Daniel J. Deneufbourg

(57) ABSTRACT

An actuator and sensor assembly comprising respective sensor and actuator housings defining an interior chamber. Clips on the sensor housing engage the actuator housing for coupling the sensor and actuator housings together. The sensor housing includes a wall defining a pocket. A connector with a sensor couples to the sensor housing in a relationship wherein the sensor extends into the sensor housing pocket. A movable piston is located in the interior chamber and a tube thereon defines a receptacle for a magnet located adjacent the pocket. The piston is seated on a flexible diaphragm. An actuator shaft includes one end coupled to the piston and an opposite end coupled to a movable object. A plurality of pins in the actuator housing mount the assembly to a support bracket. The sensor senses changes in the magnetic field in response to changes in the position of the magnet relative to the sensor.

5 Claims, 5 Drawing Sheets

(56) References Cited

U.S. PATENT DOCUMENTS

| | | | |
|---|---|---|---|
| 3,136,227 A | 6/1964 | Williams |
| 3,397,621 A | 8/1968 | Groves |
| 3,509,795 A | 5/1970 | Woodward |
| 3,575,088 A | 4/1971 | Bauer |
| 3,648,571 A | 3/1972 | Burgess |
| 3,859,619 A | 1/1975 | Ishihara et al. |
| 3,911,793 A | 10/1975 | Izumi |
| 4,005,639 A | 2/1977 | Welsh |
| 4,056,043 A | 11/1977 | Sriramamurty et al. |
| 4,070,946 A | 1/1978 | Sandvik et al. |
| 4,088,977 A | 5/1978 | Bowman, Jr. et al. |
| 4,128,044 A | 12/1978 | Larson et al. |
| 4,230,077 A | 10/1980 | Ito |
| 4,237,076 A | 12/1980 | Benjamin |
| 4,256,019 A | 3/1981 | Braddick |
| 4,282,800 A | 8/1981 | Young et al. |
| 4,283,679 A | 8/1981 | Ito et al. |
| 4,312,319 A | 1/1982 | Brakebill |
| 4,377,070 A | 3/1983 | Shadbourne |
| 4,403,538 A | 9/1983 | Rise |
| 4,437,386 A | 3/1984 | Baumgartner |
| 4,462,359 A | 7/1984 | Muller |
| 4,478,107 A | 10/1984 | Buannec |
| 4,502,847 A | 3/1985 | Pozniak et al. |
| 4,543,790 A | 10/1985 | Coll et al. |
| 4,639,667 A | 1/1987 | Andresen |
| 4,642,603 A | 2/1987 | Martinez, Jr. |
| 4,733,214 A | 3/1988 | Andresen |
| 4,746,772 A | 5/1988 | Bovee et al. |
| 4,756,229 A | 7/1988 | Drakeley |
| 4,761,608 A | 8/1988 | Franklin et al. |
| 4,805,744 A | 2/1989 | Pringle |
| 4,809,657 A | 3/1989 | Sejimo et al. |
| 4,850,263 A | 7/1989 | Rumsey et al. |
| 4,857,842 A | 8/1989 | Sturman et al. |
| 4,915,018 A | 4/1990 | Scott et al. |
| 5,016,523 A | 5/1991 | Bowyer |
| 5,177,370 A | 1/1993 | Meister |
| 5,226,312 A | 7/1993 | Gautier et al. |
| 5,226,347 A | 7/1993 | Gautier et al. |
| 5,270,645 A | 12/1993 | Wheeler et al. |
| 5,293,811 A | 3/1994 | DeLair et al. |
| 5,487,273 A | 1/1996 | Elpern et al. |
| 5,570,015 A | 10/1996 | Takaishi et al. |
| 5,727,447 A | 3/1998 | Shiraishi et al. |
| 5,771,774 A | 6/1998 | Stojic |
| 5,811,968 A | 9/1998 | Nakazawa et al. |
| 5,955,881 A | 9/1999 | White et al. |
| 6,018,241 A | 1/2000 | White et al. |
| 6,057,682 A | 5/2000 | McCurley et al. |
| 6,105,927 A | 8/2000 | Zelczer et al. |
| 6,155,048 A | 12/2000 | Vertanen |
| 6,164,187 A | 12/2000 | Stojic |
| 6,175,233 B1 | 1/2001 | McCurley et al. |
| 6,189,435 B1 | 2/2001 | Vertanen et al. |
| 6,255,941 B1 | 7/2001 | Osterman et al. |
| 6,289,602 B1 | 9/2001 | Chiddister |
| 6,304,078 B1 | 10/2001 | Jarrard et al. |
| 6,349,629 B1 | 2/2002 | Plantan et al. |
| 6,352,137 B1 | 3/2002 | Stegall et al. |
| 6,356,811 B1 | 3/2002 | Beselt |
| 6,360,649 B1 | 3/2002 | Plantan |
| 6,417,768 B2 | 7/2002 | Osterman et al. |
| 6,501,375 B1 | 12/2002 | Weant et al. |
| 6,526,866 B2 | 3/2003 | Pisoni et al. |
| 6,536,329 B2 | 3/2003 | Anderson et al. |
| 6,536,469 B2 | 3/2003 | Dilger et al. |
| 6,564,554 B2 | 5/2003 | Hercey et al. |
| 6,633,157 B1 | 10/2003 | Yamaki et al. |
| 6,662,708 B2 | 12/2003 | Hosny |
| 6,690,158 B2 | 2/2004 | Saito et al. |
| 6,748,848 B1 | 6/2004 | Riley et al. |
| 6,752,171 B1 | 6/2004 | Kemmler et al. |
| 6,888,451 B1 | 5/2005 | Plantan |
| 6,968,742 B2 | 11/2005 | Rodenhauser et al. |
| 6,988,443 B2 | 1/2006 | Morris |
| 7,014,016 B2 | 3/2006 | Morris et al. |
| 7,044,444 B2 | 5/2006 | Haubold et al. |
| 7,194,946 B2 | 3/2007 | Bacardit |
| 7,199,578 B2 | 4/2007 | Rohner et al. |
| 7,219,691 B2 | 5/2007 | Gethmann et al. |
| 7,340,895 B2 | 3/2008 | Noelle |
| 7,387,080 B2 | 6/2008 | Andronic |
| 7,423,421 B2 | 9/2008 | Reichert et al. |
| 7,439,732 B2 | 10/2008 | LaPlaca |
| 7,451,690 B2 | 11/2008 | Schrader et al. |
| 7,454,979 B2 | 11/2008 | Frank et al. |
| 7,570,047 B2 | 8/2009 | Stuve et al. |
| 7,762,220 B2 | 7/2010 | Okanovic et al. |
| 7,823,385 B2 | 11/2010 | McEwen et al. |
| 7,852,067 B2 | 12/2010 | Schmid et al. |
| 7,946,555 B2 | 5/2011 | Ikeda |
| 2003/0030958 A1 | 2/2003 | Saito et al. |
| 2004/0250678 A1 | 12/2004 | Bonotto et al. |
| 2005/0061144 A1 | 3/2005 | Schall |
| 2005/0087067 A1 | 4/2005 | Vermoesen et al. |
| 2005/0264280 A1 | 12/2005 | Shoji et al. |
| 2007/0257219 A1 | 11/2007 | Perrin |
| 2008/0230328 A1 | 9/2008 | Lacroix et al. |
| 2009/0139587 A1 | 6/2009 | Spliethoff et al. |
| 2009/0140730 A1 | 6/2009 | Newman et al. |
| 2009/0205332 A1 | 8/2009 | Baeuerle et al. |
| 2009/0206846 A1 | 8/2009 | Sanchez et al. |
| 2010/0127697 A1 | 5/2010 | Storrie et al. |
| 2011/0079138 A1 | 4/2011 | Storrie et al. |
| 2011/0247484 A1 | 10/2011 | Klesbauer et al. |
| 2011/0262266 A1 | 10/2011 | Rakod et al. |
| 2011/0308897 A1 | 12/2011 | Wallace et al. |

FOREIGN PATENT DOCUMENTS

| | | |
|---|---|---|
| DE | 29 23 644 | 12/1979 |
| DE | 100 59 337 | 6/2001 |
| DE | 203 08 810 | 10/2003 |
| DE | 10 2005 024 101 | 12/2005 |
| DE | 10 2005 013 442 | 9/2006 |
| DE | 10 2005 02990 | 1/2007 |
| DE | 10 2006-021 129 | 6/2007 |
| DE | 10 2006 021 127 | 8/2007 |
| DE | 10 2008 03050 | 1/2009 |
| DE | 10 2008 01170 | 9/2009 |
| DE | 10 2009 03295 | 1/2011 |
| DE | 20 2011 03003 | 4/2011 |
| EP | 96408 | 12/1983 |
| EP | 261537 | 3/1988 |
| EP | 0 738 892 | 10/1996 |
| EP | 1 182 461 | 2/2002 |
| EP | 1662232 | 5/2006 |
| EP | 1 701 015 | 9/2006 |
| EP | 1 884 636 | 2/2008 |
| EP | 1 972 916 | 9/2008 |
| EP | 2 068 061 | 6/2009 |
| EP | 2 161 460 | 3/2010 |
| EP | 2 208 893 | 7/2010 |
| EP | 2 199 565 | 1/2011 |
| EP | 1 852 588 | 5/2011 |
| EP | 1 852 587 | 6/2011 |
| EP | 1 852 586 | 9/2011 |
| GB | 2256050 | 11/1992 |
| GB | 2261472 | 5/1993 |
| GB | 2322164 | 8/1998 |
| GB | 2468779 | 9/2010 |
| JP | H04-057704 | 5/1992 |
| JP | 05 264326 | 10/1993 |
| JP | H07-294209 | 11/1995 |
| WO | WO03/093769 A1 | 11/2003 |
| WO | WO 2009/073170 | 6/2009 |

OTHER PUBLICATIONS

Woco Industrietechnik GmbH, Woco Actuators, www.wocogroup.com (2011), 1 page, Bad Soden-Salmünster, Germany.

SMK, SMK Actuators, www.smk-systeme.de (2011), 2 pages, Filderstadt, Germany.

(56) References Cited

OTHER PUBLICATIONS

Padmini VNA Mechatronics Pvt. Ltd., Padmini EGR/Secondary AIR Injection, www.padminivna.com (2009), 1 page, Gurgaon, India.

Padmini VNA Mechatronics Pvt. Ltd., Padmini Actuator, www.padminivna.com (2009), 1 page, Gurgaon, India.

CTS Automotive Products, product brochure for 586 Series Non-Contacting, 2-Piece Linear Position Sensor (2009), 2 pages, Elkhart, Indiana.

CTS Corporation, CTS 569 Turbo Sensor, Exploded views and Cross Section Detail (2011), 4 pages, Elkhart, Indiana.

CTS Automotive Products, product brochure for 569 Series High Temperature Linear Position Sensor (2007), 2 pages, Elkhart, Indiana.

CTS Automotive Products, product brochure for 537 Series Linear EGR Sensor (2007), 2 pages, Elkhart, Indiana.

INZI Controls Company, INZI Vacuum Actuators, www.inzicontrols.devu.kr (2007), 3 pages, Kyunggi-do, Korea.

Melexis (Microelectronic Integrated Systems) MLX90316 Rotary Position Sensor IC Data Sheet Dated Sep. 20, 2005, pp. 1-34, Melexis NV, Ieper, Belgium.

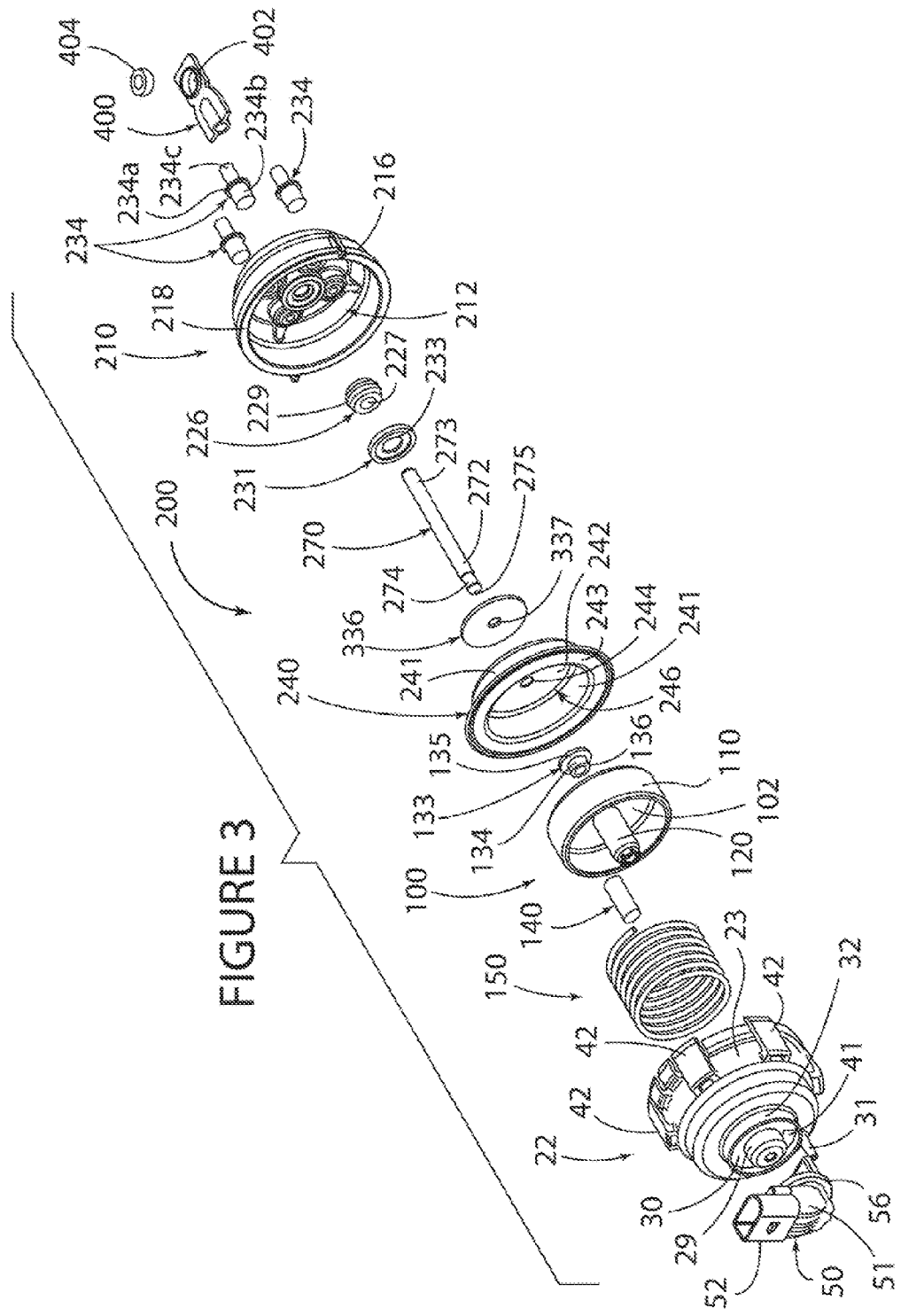

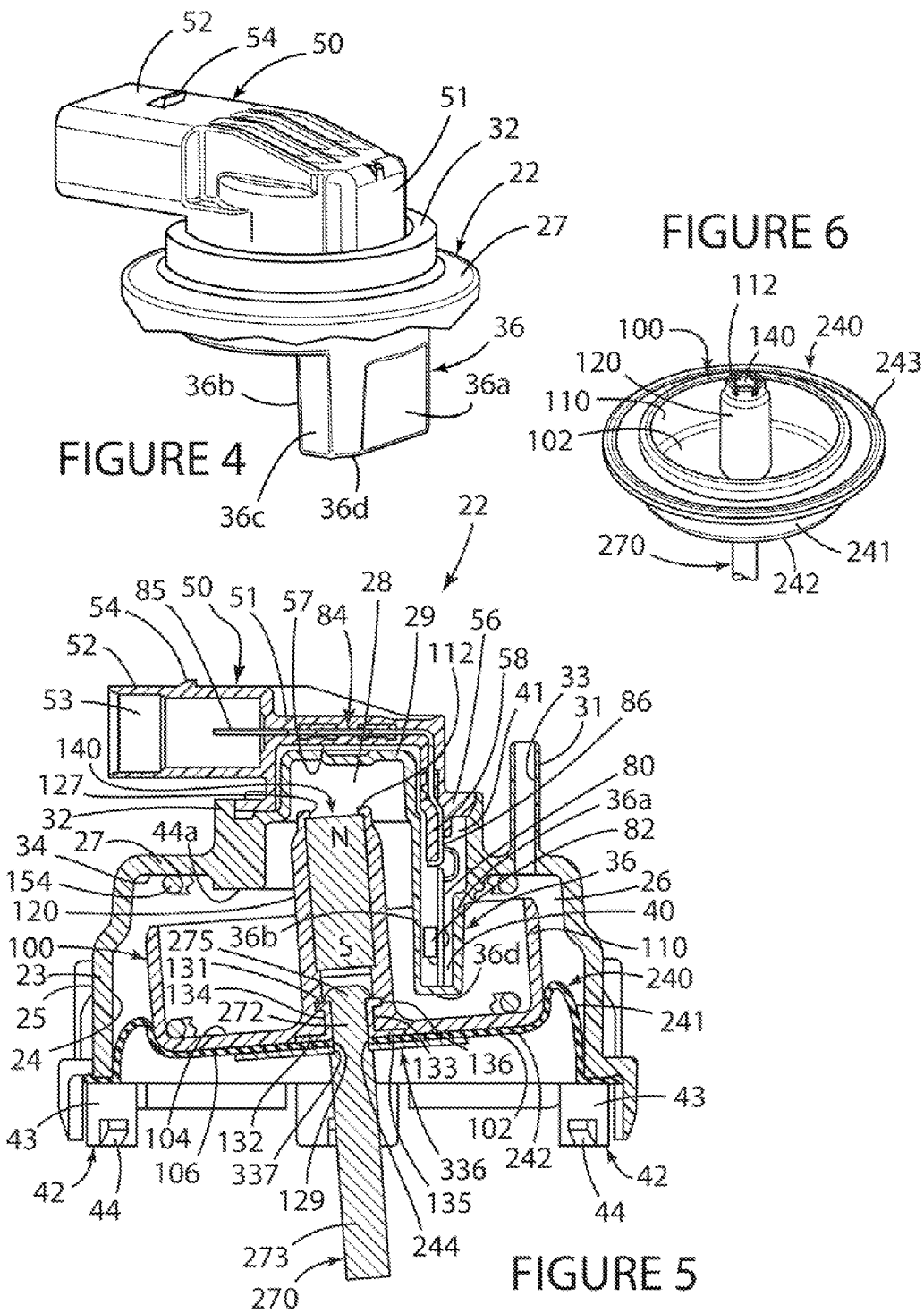

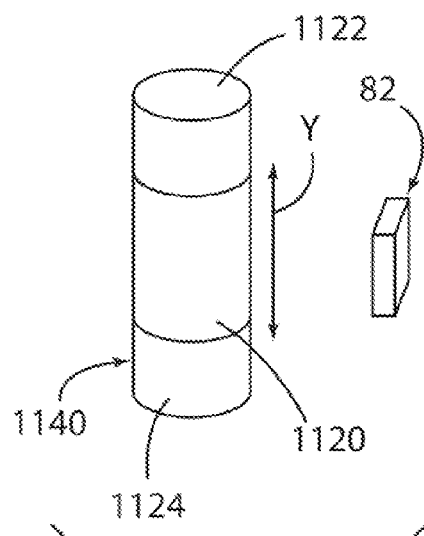
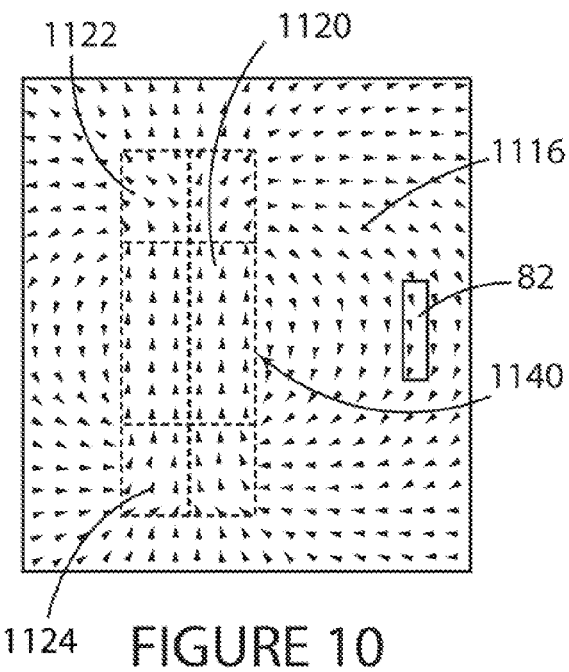
FIGURE 9
FIGURE 10
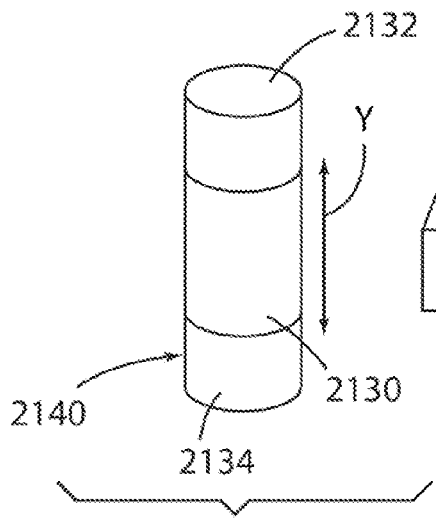
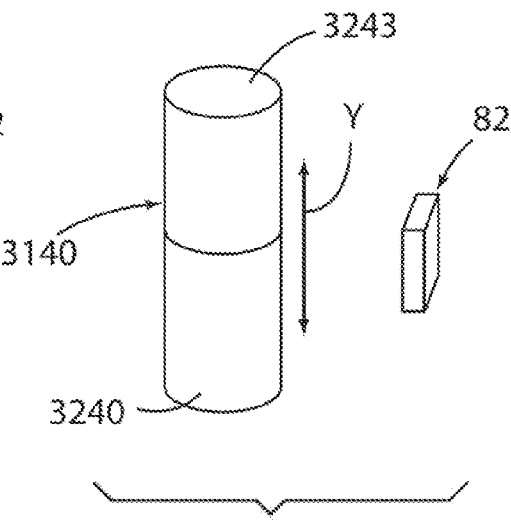
FIGURE 11
FIGURE 12

ACTUATOR AND SENSOR ASSEMBLY

CROSS REFERENCE TO RELATED AND CO-PENDING APPLICATIONS

This application claims the benefit of the filing date and disclosure of U.S. Provisional Patent Application Ser. No. 61/284,027 filed on Dec. 9, 2009; U.S. Provisional Patent Application Ser. No. 61/284,028 filed on Dec. 9, 2009; and U.S. Provisional Patent Application Ser. No. 61/340,813 filed on Mar. 22, 2010, the contents of which are entirely incorporated herein by reference as are all references cited therein.

This application also claims the benefit of the filing date and disclosure of, and is a continuation-in-part application of, U.S. patent application Ser. No. 12/315,332 filed on Dec. 2, 2008 now U.S. Pat. No. 8,395,374 and U.S. patent application Ser. No. 12/592,170 filed on Nov. 20, 2009, the contents of which are also entirely incorporated herein by reference as are all references cited therein.

FIELD OF THE INVENTION

This invention relates, in general, to an actuator and sensor assembly and, more particularly, to a non-contacting linear position sensor coupled to an actuator.

BACKGROUND OF THE INVENTION

Position sensing is used to electronically monitor the position or movement of a mechanical component. The position sensor is coupled to an actuator and is adapted to produce an electrical signal that varies as the position of the component in question varies. Actuator and sensor assemblies are included in many products. For example, actuator and sensor assemblies allow the status of various automotive components to be monitored and controlled electronically.

A position sensor needs to be accurate, in that it must give an appropriate electrical signal based upon the position measured. If inaccurate, a position sensor may hinder the proper evaluation and control of the position of the component being monitored.

Typically, it is also a requirement that a position sensor be adequately precise in its measurement. However, the precision needed in measuring a position will obviously vary depending upon the particular circumstances of use. For some purposes, only a rough indication of position is necessary; for instance, an indication of whether a valve is mostly open or mostly closed. In other applications, more precise indication of position may be needed.

A position sensor should also be sufficiently durable for the environment in which it is placed. For example, a position sensor used on an automotive valve may experience almost constant movement while the automobile is in operation. Such a position sensor should be constructed of mechanical and electrical components adequate to allow the sensor to remain sufficiently accurate and precise during its projected lifetime, despite considerable mechanical vibrations and thermal extremes and gradients.

In the past, position sensors were typically of the "contact" variety, A contacting position sensor requires physical contact to produce the electrical signal. Contacting position sensors typically consist of potentiometers that produce electrical signals which vary as a function of the component's position. Contacting position sensors are generally accurate and precise. Unfortunately, the wear due to contact during movement has limited their durability. Also, the friction resulting from the contact can degrade the operation of the component. Further, water intrusion into a potentiometric sensor can disable the sensor.

One advancement in sensor technology has been the development of non-contacting position sensors. A non-contacting position sensor ("NPS") does not require physical contact between the signal generator and the sensing element. Instead, an NPS utilizes one or more magnets to generate magnetic fields that vary as a function of position, and devices to detect varying magnetic fields to measure the position of the component to be monitored. Often, a Hall Effect device is used to produce an electrical signal that is dependent upon the magnitude, polarity, or direction of the magnetic flux incident upon the device. The Hall Effect device may be physically attached to the component to be monitored and thus moves relative to the stationary magnet(s) as the component moves. Conversely, the Hall Effect device may be stationary with the magnet(s) affixed directly or indirectly to the component to be monitored. In either case, the position of the component to be monitored can be determined by the electrical signal produced by the Hall Effect device.

Although currently available actuator and NPS assemblies have proven satisfactory, there continues to be a need for improved, lower cost actuator and NPS assemblies.

SUMMARY OF THE INVENTION

The present invention is directed to, in one embodiment, an actuator and sensor assembly which comprises a sensor housing including a wall defining a pocket and a connector assembly which includes a sensor and is adapted for coupling to the sensor housing in a relationship wherein the sensor extends into the pocket defined by the wall of the sensor housing. The assembly further comprises an actuator housing including a base defining an aperture and the sensor housing and the actuator housing are coupled together and define an interior cavity. A piston is located and movable in the interior cavity and defines a receptacle. A magnet is located in the receptacle of the piston and the magnet generates a magnetic field. The sensor is adapted to sense a change in the magnetic field in response to the movement of the piston and the magnet relative to the sensor. The assembly still further comprises an actuator shaft including a first end coupled to the piston and a second end extending through the aperture in the actuator housing and into coupling relationship with a movable object.

The actuator and sensor assembly further comprises, in one embodiment, a flexible diaphragm located in the interior cavity and the piston is seated on the flexible diaphragm. A spring is also located in the interior cavity against the piston and biases the piston in a first position. A source of pressurization is coupled to one of the sensor housing or the actuator housing and in fluid flow communication with the interior cavity for adjusting the pressure in the interior cavity and causing the movement of the piston.

The actuator and sensor assembly still further comprises, in one embodiment, a plurality of clips on one of the sensor housing or the actuator housing and a flange on the other of the sensor housing or the actuator housing. The plurality of clips engage against the flange for coupling the sensor housing and the actuator housing together.

Further, in one embodiment the magnet comprises at least first and second stacked portions made of different magnetic materials. In one embodiment, the first portion is made of an NdFeB material and the second portion is made of either an iron or steel material.

Still further, in one embodiment, the base of the actuator housing defines a plurality of cavities and the actuator and sensor assembly further comprises a plurality of mounting pins including respective heads extending into the plurality of cavities respectively in the base of the actuator housing. In one embodiment, the base of the actuator housing also defines a central cavity, a gimbal is located in the central cavity and defines a central through aperture, and the actuator shaft extends through the central aperture of the gimbal.

Other advantages and features of the present invention will be more readily apparent from the following detailed description of the preferred embodiment of the invention, the accompanying drawings, and the appended claims.

BRIEF DESCRIPTION OF THE DRAWINGS

In the accompanying drawings that form part of the specification, and in which like numerals are employed to designate like parts throughout the same:

FIG. 3 is an exploded perspective view of the actuator and sensor assembly of FIG. 1;

FIG. 4 is a broken perspective view of the sensor housing and the connector assembly of the actuator and sensor assembly of FIGS. 1-3;

FIG. 5 is a vertical cross-sectional view of the connector assembly, the sensor housing, and the piston/magnet carrier assembly of the actuator and sensor assembly shown in FIGS. 1-3;

FIG. 6 is a top perspective view of the of the piston/magnet carrier assembly seated in the diaphragm of the actuator and sensor assembly shown in FIGS. 1-3;

FIG. 9 is a simplified perspective view of a first alternate embodiment of the magnet assembly of the actuator and sensor assembly shown in FIGS. 1-3;

FIG. 10 is a simplified diagram depicting the magnetic field generated by the magnet assembly of FIG. 9;

FIG. 11 is a simplified perspective view of a second alternate embodiment of the magnet assembly of the actuator and sensor assembly shown in FIGS. 1-3; and FIG. 12 is a simplified perspective view of a third alternate embodiment of the magnet assembly of the actuator and sensor assembly shown in FIGS. 1-3.

DETAILED DESCRIPTION OF THE EMBODIMENT

Figure 1:
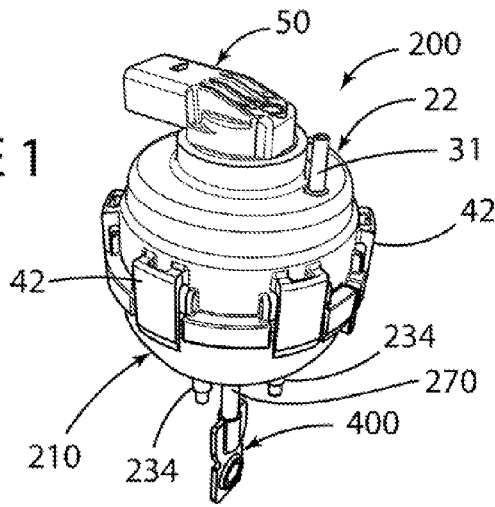
FIG. 1 is a perspective view of an actuator and sensor assembly in accordance with the present invention.
Figure 2:
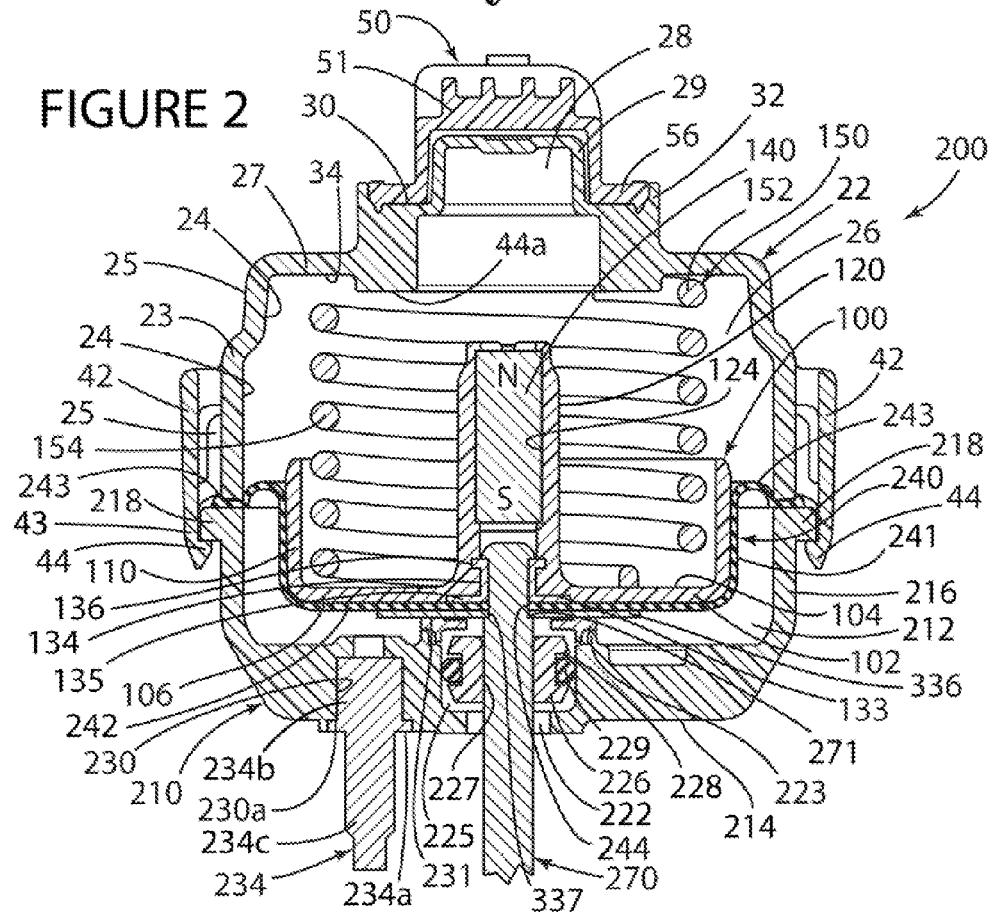
FIG. 2 is a broken vertical cross-sectional view of the actuator and sensor assembly shown in FIG. 1.
Figure 7:
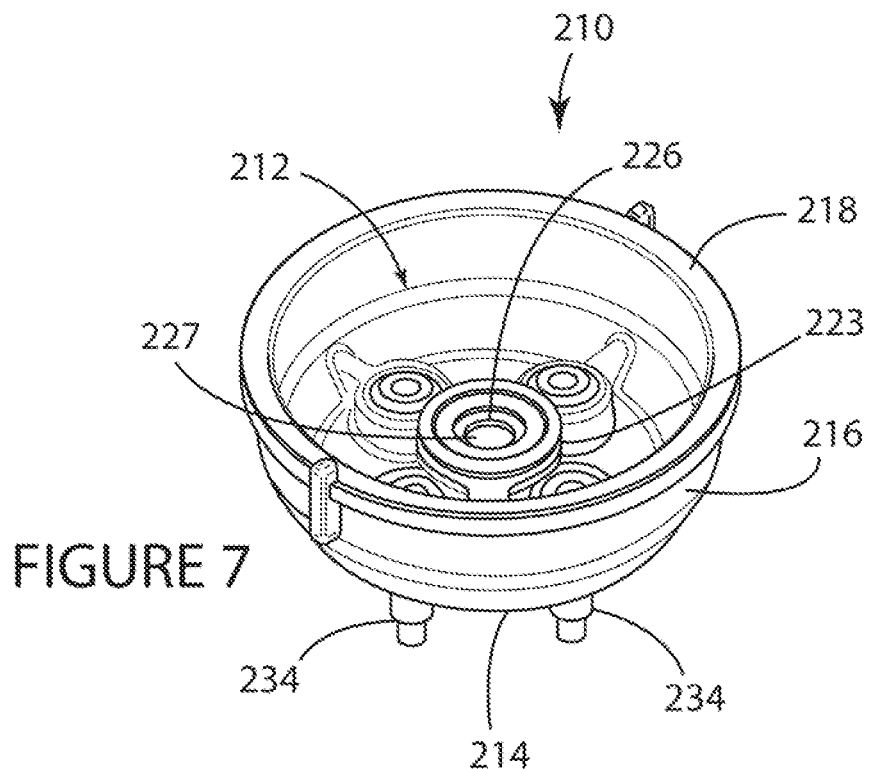
FIG. 7 is a top perspective view of the actuator housing of the actuator and sensor assembly shown in FIGS. 1-3.
Figure 8:
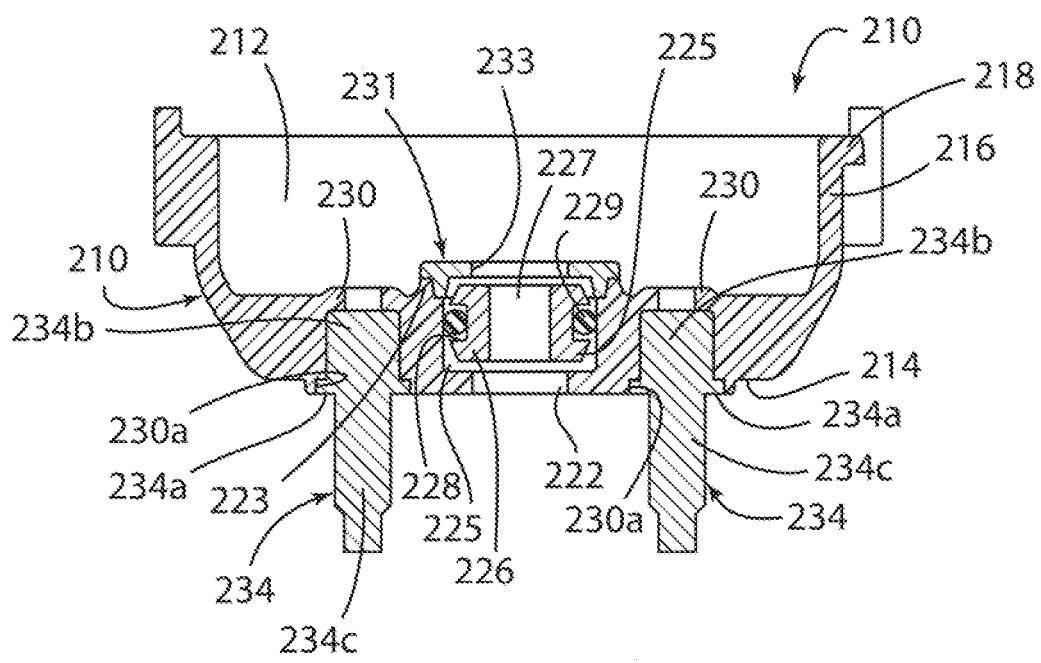
FIG. 8 is a vertical cross-sectional view of the actuator housing of the actuator and sensor assembly shown in FIGS. 1-3.

An actuator and sensor assembly 200 in accordance with the present invention is shown in FIGS. 1-3.

Actuator and sensor assembly 200 initially comprises an upper or top sensor housing or cover member 22 (FIGS. 1, 2, 3, 4) and a lower or bottom actuator cover or housing member 210 (FIGS. 1, 2, 3, 7, 8) which are coupled to each other and together define an interior housing or enclosure or chamber for a plurality of elements including a combination piston/magnet carrier assembly 100 (FIGS. 2, 3, 5, 6) and a spring 150 (FIGS. 2 and 3) as described in more detail below.

Sensor housing or cover 22, which may be made from any suitable injection molded plastic, is in the embodiment shown generally dome-shaped and includes a rounded top wall or roof 27 (FIGS. 2, 3, 5) and a unitary downwardly extending circumferential exterior wall or skirt portion 23 (FIGS. 2, 3, 5) having an inner surface 24 and an outer surface 25. The roof 27 and the skirt portion 23 together define an interior sensor cavity or chamber 26.

The roof 27 further includes a dome 29 (FIGS. 2, 3, 5) defining an interior bore or cavity 28 that is co-axial with and opens into the cavity 26. The dome 29 further defines an exterior circumferential recess 30 (FIGS. 2, 3) and a collar 32 (FIGS. 2, 3) which surrounds the recess 30. An elongate, generally cylindrical hollow tube 31 (FIGS. 1, 3, 5) extends generally vertically outwardly and upwardly from a portion of the roof 27 and defines an interior port or passage 33 (FIG. 5) in fluid flow communication with the interior of the cavity 26. The tube 31 can be connected to a source of pneumatic fluid such as air.

A circumferentially extending shoulder or collar 44a (FIGS. 2 and 5) extends downwardly into the cavity 26 from a portion of the interior surface of the roof 27. A circumferential recess or groove 34 is defined in a portion of the interior surface of the roof 27 and surrounds the collar 44a.

An elongated circumferentially extending wall 36 (FIGS. 4, 5) extends unitarily downwardly from another portion of the interior surface of the wall or roof 27 into the cavity 26. The wall 36 includes a first pair of spaced-apart and generally parallel and vertically oriented side wall portions 36a and 36b, a second pair of spaced-apart and generally parallel and vertically oriented wall portions 36c (only one of which is shown in FIG. 4), and a bottom generally horizontal wall or floor 38 which connects the lower distal peripheral ends of the vertical wall portions 36a, 36b, and 36c. The wall 36 and, more specifically, wall portions 36a, 36b, 36c, and 36d thereof together define a sensor/substrate cavity or pocket 40 (FIG. 5) which is accessible through an opening 41 (FIG. 5) defined in the roof 27 of the housing member 22 by the wall 36. The wall 36 and, more specifically, the wall portions 36a, 36b, 36c, and 36d thereof separate and isolate the pocket 40 from the cavity 26, i.e., the pocket 40 is defined and bounded by the respective interior surfaces of the respective walls 36a, 36b, 36c, and 36d, while the respective exterior surfaces of the respective walls 36a, 36b, 36c, and 36d face the cavity 26.

A plurality of generally L-shaped flexible elongate clips or fingers 42 (FIGS. 2, 3, 5) protrude outwardly from the outside surface of the skirt portion 23 of the housing member 22 thereof. Each of the clips 42 includes a distal end 43 (FIGS. 2 and 5) which projects or extends downwardly past the distal circumferential edge of the skirt 23 and terminates in an inwardly projecting distal rib or ledge or shoulder 44.

A connector assembly 50 (FIGS. 1, 2, 3, 5), which may also be made from any suitable injection molded plastic, is mounted over and coupled to the roof 27 of the housing member 22 and, more specifically, over the dome 29 of the roof 27 of the housing member 22. Connector assembly 50 includes a body 51 and a shroud 52 that extends unitarily from the body 51 in a relationship spaced from and generally parallel to the roof 27 of the housing 22. The shroud 52 defines an open interior 53 (FIG. 5). A locking tab 54 is located on and projects outwardly from a top exterior surface of the shroud 52. An electrical connector (not shown) is adapted to be coupled to the end of the shroud 52 and retained to the shroud 52 by the locking tab 54. The electrical connector (not shown) may be connected to a wire harness (not shown).

Connector assembly 50 further comprises an annular distal circumferential flange 56 (FIGS. 2, 3, 5) that extends and projects generally normally and unitarily outwardly from a distal peripheral circumferential edge of the body 51. The connector assembly 50 is coupled to and over the top of the housing member 22 and, more specifically, the walls 27 and 36 of the housing member 22 in a relationship wherein the flange 56 of the connector assembly 50 is seated in the recess 30 of the housing member 22; is surrounded by the collar 32 of the housing member 22; and is secured to the housing member 22 by heat staking, ultrasonically welding, or the like means or method. The body 51 further defines an interior recess 57 (FIG. 5) which allows the connector assembly 50 to be seated over the dome 29 defined by the wall/roof 27 of the housing member 22. The body 51 of connector assembly 50 also includes a downwardly projecting unitary arm 58 that extends through the opening 41 in the wall 36 and partially into the pocket 40 defined by the wall 36 of the housing member 22 when the connector assembly 50 is seated on and coupled to the top of the housing member 22.

A plurality of electrically conductive generally L-shaped terminals 84 (only one of which is shown in FIG. 5) are insert-molded into and extend through the body 51 of the connector assembly 50. The terminals 84 are retained by, and pass through, the interior of the body 51 and onto the arm 58. Each of the terminals 84 defines respective opposed distal ends 85 and 86. The terminal end 85 extends into the interior cavity 53 defined by the shroud 52 and is adapted for connection to an electrical connector (not shown). The terminal end 86 extends over the distal end of the arm 58 and is coupled to a substrate 80 (FIG. 5) by press-fitting, soldering, wire-bonding, or the like means or method.

Substrate 80 can be a conventional printed circuit board formed from FR4 or the like material. The substrate 80 extends generally co-planarly outwardly from the distal end of the arm 58 in a relationship generally normal to the shroud 52. A sensor 82 (FIG. 5) is mounted to one of the exterior surfaces of the substrate 80. Sensor 82 can be a magnetic field sensor such as a Hall Effect device. In one embodiment, the sensor 82 is an integrated circuit available from Melexis Corporation of Ieper, Belgium which is adapted to sense and measure at least changes in the direction of the magnetic field generated by the magnet.

Although not shown, it is understood that other electronic components such as, for example, capacitors, resistors, inductors and other signal conditioning components are mounted on one or both exterior surfaces of the substrate 80. Additionally, it is understood that one or more circuit lines (not shown) are also located and defined on or in the substrate 80 for electrically connecting the sensor 82 and the other electronic components thereon to the end 86 of the respective terminals 84 on the arm 58 of the connector assembly 50.

As shown in FIG. 5, when the connector assembly 50 is coupled to the top of the roof 27 of the housing cover 22, a portion of the arm 58 thereof and the substrate 80 coupled to the distal end of the arm 58 extend into the housing pocket 40 which is defined in the roof 27 of the housing member 22 by the circumferential wall 36 thereof.

The actuator assembly 200 also comprises a lower or bottom actuator cover or housing member 210 which may also be made from a suitable injection molded plastic. The housing member 210 includes a generally circular-shaped bottom wall or floor or base 214 (FIGS. 2, 8) and a circumferential side wall 216 which extends generally unitarily upwardly from a peripheral circumferential edge of the floor 214. The walls 214 and 216 together define a cup-shaped housing member 210 which defines an interior cavity or chamber 212 (FIGS. 2, 3, 7, 8). An upper terminal end portion of the side wall 216 defines a circumferentially extending and outwardly projecting flange or collar or ledge or lip 218 (FIGS. 2, 3, 7, 8). A central through aperture 222 (FIGS. 2, 8) defines an entry into the cavity or chamber 212 and extends through the floor 214 of the housing member 210.

A first interior circumferentially extending wall 223 (FIGS. 2, 3, 7, 8) protrudes generally normally unitarily upwardly from a center portion of the interior surface of the floor 214 of the housing member 210. Wall 223 surrounds and is spaced from the central aperture 222 defined in the floor 214 of the housing member 210.

The floor 214 and the wall 223 together define a pocket or cavity 225 (FIGS. 2, 8) for a gimbal 226 (FIGS. 2, 3, 7, 8). The gimbal 226 defines a central through aperture 227 (FIGS. 3, 7, 8) and an outer surface defining a circumferential recess 228 (FIGS. 2, 8) adapted to receive an o-ring 229 (FIGS. 2, 3, 8) which provides a flexible mechanical bearing between the interior surface of the wall 223 of the housing member 210 and the gimbal 226.

The floor 214 of the housing member 210 additionally defines at least three generally cylindrically-shaped hollow peripheral heads 230 (FIGS. 2, 8) protruding outwardly from the interior surface of the floor 214 and defining respective interior cavities. Each of the heads 230 defines an opening and a generally ring-shaped groove or shoulder 230a (FIGS. 2 and 8) in the floor 214 of the housing member 210.

Actuator assembly 200 further comprises a plurality of mounting screws or pins 234 (FIGS. 2, 3, 8) which are insert molded into the respective cavities in the respective heads 230 defined in the floor 214 of the housing member 210. Specifically, each of the pins 234 includes a head 234b which is insert molded into the respective head 230 in the floor 214 of the housing member 210 and a ring or flange 234a which surrounds the head 234b and extends into abutting relationship with the respective ring-shaped groove 230a formed in the floor 214 of the housing member 210.

Each of the pins 234 further includes a leg 234c (FIGS. 2, 3, 8) which is adapted to extend through the respective openings of a supporting bracket (not shown) which is fastened to a vehicle engine or engine component such as, for example, a turbocharger.

The respective housing members 22 and 210 are snap-fitted or clipped together as shown in FIG. 2. Specifically, and although not shown in any of the FIGURES, it is understood that when the respective housing members 22 and 210 are brought together during the assembly process, the flange 218 on the housing member 210 is brought into abutting relationship with the exterior sloped side wall of the respective projections 44 formed on the interior surface of the distal end 43 of the respective flexible clips 42 formed on the housing member 22 which causes the respective clips 42 to initially flex outwardly and then back inwardly after the flange 218 on the housing member 210 clears the respective projections 44 into the relationship as shown in FIG. 2 wherein the lower surface of the flange 218 is seated against the upper surface of each of the respective projections 44 on the respective clips 42 and the terminal distal end of the wall 23 of the housing member 22 is disposed opposite and generally co-planarly with, the terminal distal end of the wall 216 of the housing member 210.

Actuator and sensor assembly 200 further comprises a flexible rubber plunger or diaphragm 240 (FIGS. 2, 3, 6) which, as particularly shown in FIG. 2, is located in the cavity 212 of the housing member 210. Diaphragm 240, in the configuration as shown in FIGS. 2, 3, and 6, is in the shape of a cup having a bottom annular wall or floor or base 242 (FIGS. 2, 3, 5, 6) and a peripheral circumferentially extending side wall 241 (FIGS. 2, 3, 5, 6) including a distal outwardly projecting and circumferentially extending flange or collar or lip 243 (FIGS. 2, 3, 5, 6). The floor 242 also defines a central opening 244 (FIGS. 3, 5). In the configuration of FIGS. 2, 3, and 6, the wall 241 and floor 242 together define an interior cavity or recess 246 (FIG. 3).

As shown in FIG. 2, the collar or flange 243 of the diaphragm 240 is wedged and secured between the top exterior surface of the flange 218 of the housing member 210 and the terminal exterior end surface of the wall 23 of the housing member 22 in the coupled and snapped together relationship of the respective housing members 22 and 210.

Actuator and sensor assembly 200 still further comprises a circular piston washer 336 (FIGS. 2, 3, 5) which defines a central aperture 337 (FIGS. 3 and 5). Piston washer 336 is seated in the interior of the assembly 200 against the top exterior surface of the wall 223 of the housing member 210 in a relationship wherein the central aperture 337 thereof is aligned with the central aperture 222 defined in the floor 214 of the housing member 210.

Actuator and sensor assembly 200 still further comprises an elongated piston rod or actuator shaft 270 (FIGS. 1, 2, 3, 5, 6) including opposed ends 272 and 273 (FIGS. 3, 5). Shaft 270 can be attached to a variety of objects whose linear position requires adjustment or measurement such as, for example, the by-pass or waste gate valve of a turbo-charger that is attached to an engine.

The end 272 of the shaft 270 additionally defines a head 275 (FIGS. 3, 5) which abuts against the top collar 136 of a piston insert 133 as described in more detail below. The end 272 of the shaft 270 additionally defines a circumferentially and inwardly extending shoulder or recess 271.

A piston rod or shaft adjuster 400 (FIGS. 1, 3) is coupled to the lower end 273 of the shaft 270. Adjuster 400 defines an aperture 402 (FIG. 3) which receives a ball joint 404 (FIG. 3).

Piston/magnet carrier assembly 100 (FIGS. 2, 3, 5, 6), which may also be made from any suitable injection molded plastic, is located in the interior of the assembly 200 and, more specifically, in the cavities 26 and 212 of the respective housing members 22 and 210 as described in more detail below. Piston/magnet carrier assembly 100 is generally cup-shaped and includes a circular circumferentially extending annular base 102 and a circumferential side wall 110 which extends unitarily generally normally upwardly from the peripheral circumferential edge of the base 102. The base 102 has a top portion or face 104 and a bottom portion or face 106.

Piston/magnet carrier assembly 100 further includes a hollow tube or receptacle 120 (FIGS. 2, 3, 5, 6) which, in the embodiment shown, is generally cylindrically shaped and extends centrally unitarily upwardly from the top portion 104 of the base 102 in a relationship generally normal to the base 102. The tube 120 is defined by a circumferential cylindrical wall defining an interior cylindrical surface 124. The tube 120 and, more specifically, the interior surface 124 thereof, defines an elongate magnet receiving bore or pocket or receptacle that, in turn, defines central through openings 127 and 129 (FIG. 5) in the top of the tube 120 and the base 102 of the piston/magnet carrier assembly 100 respectively. The interior surface 124 of the tube 120 also defines a circumferential recess or groove 131 (FIG. 5) located adjacent but spaced from the base 102. The base 102 and, more specifically, the bottom face 106 thereof, defines a central annular recess or groove 132 (FIG. 5) which surrounds the central opening 129 and is spaced from and parallel to the recess or groove 131 defined in the tube 120.

The piston insert 133 (FIGS. 2, 3, 5) is fitted in the interior of the tube 120. Insert 133 comprises a cylindrical hollow neck 134 (FIGS. 2, 3, 5) including opposed distal ends terminating in respective annular collars 135 and 136 projecting outwardly from the outer surface of the neck 134. Collar 135 is wider than the collar 136.

During the assembly process, the insert 133 is fitted by insert-molding or other means in the lower end of the tube 120 into a relationship wherein the outside surface of the neck 134 of the insert 133 is positioned in abutting relationship with and against the interior surface 124 of the tube 120 and the respective collars 135 and 136 are fitted into the respective recesses or grooves 132 and 131 in the tube 120 and the base 102 of the piston/magnet carrier assembly 100 respectively.

Still further, during the assembly process, the diaphragm 240 is wrapped around the exterior of the piston/magnet carrier assembly 100 as shown in FIGS. 2 and 6 (i.e., the piston/magnet carrier assembly 100 is seated in and against the diaphragm 240). The washer 336 is then abutted against the exterior surface of the diaphragm 240 in a relationship wherein the central aperture 337 thereof is positioned co-linearly with the central aperture 244 of the diaphragm. Also, during the assembly process, the shaft 270 and, more specifically, the end 272 thereof, is then inserted and extended successively through the apertures 337 and 244 in the washer 336 and the diaphragm 240 respectively and then through the interior of the piston insert 133 into a relationship wherein the circumferential shoulder 271 extending around the end 272 of the shaft 270 is abutted against the exterior surface of the washer 336 and the distal end face of the end 272 of the shaft 270 protrudes outwardly from and past the collar 136 of the piston insert 133. Further, during the assembly process, the head 275 of the shaft 270 is then formed on the distal end face of the end 272 of the shaft 270, as by welding or the like method, through the open top of the tube 120 to secure the end 272 of the shaft 270, and thus the shaft 270, to the piston/magnet carrier assembly 100.

Also, during the assembly process, an elongated magnet 140 (FIGS. 2, 3, 5) is inserted into the interior of the tube 120 of the piston/magnet carrier assembly 100 through the top of the tube 120 and is held in place therein with a heat stake 112 (FIGS. 5 and 6) which is formed at the top end of the tube 120. Alternatively, the magnet 140 may be press fit into the tube 120.

Magnet 140 is a permanent magnet that is polarized to define a north pole and a south pole (FIGS. 2, 5). Magnet 140 can, in one embodiment, be made from any one of several different magnetic materials such as, but not limited to, ferrite or samarium cobalt or neodymium-iron-boron. Magnet 140 can be cylindrical in shape as shown or may be of any other desired shape or configuration such as, for example, square and thus it is also further understood that the tube 120 may also be shaped and configured to accept or house any other differently shaped or configured magnet such as, for example, a square shaped tube to accept or house a square shaped magnet.

Thereafter, and still during the assembly process, the piston/magnet carrier assembly 100 with the diaphragm 240 and the shaft 270 coupled thereto is mounted in the interior of the cavity 212 of the housing member 210 into the relationship as shown in FIG. 2 wherein the piston/magnet carrier assembly 100 is seated against the top of the wall 223 of the housing member 210 and the shaft 220 extends successively through the openings 227 and 222 defined in the gimbal 226 and the base 214 of the housing member 210 respectively.

The assembly 200 still further comprises a helical metal coil spring 150 (FIGS. 2, 3) which is also located in the interior of the assembly 200 and, more specifically, is located and mounted in the region of the interior cavity 26 bounded by the interior surface of the roof 27 of the housing member 22 at one end and the base 102 of the piston/magnet carrier assembly 100 at the other end. Coil spring 150 has opposed ends 152 and 154 (FIG. 2). End 152 is seated in and against the groove 34 defined in the interior surface of the roof 27 of the housing member 22 and the end 154 is seated against the top surface 104 of the base 102 of the piston/magnet carrier assembly 100. Spring 150 surrounds and is spaced from the tube 120. Although not shown in any of the FIGURES, spring 150 also extends around and is spaced from the wall 36 and the sensor pocket 40. The pocket 40 is thus located between the magnet carrier tube 120 and the spring 150.

The spring 150 biases and keeps the piston/magnet carrier assembly 100 in a first position as shown in FIG. 2 against the top of the wall 223 of the housing member 210 and is oriented such that the spring 150 can be compressed and depressed along the axis of movement of piston/magnet carrier assembly 100.

Although not shown or described in great detail herein, it is understood that the tube 31 is connected to a source of vacuum such as an engine intake manifold or vacuum tank (not shown). An increase in the vacuum in the tube 31 causes a decrease in the air pressure in the interior of the assembly 200 and causes the piston/magnet assembly 100 to move linearly upwardly from its first position as shown in FIG. 2 to a plurality of intermediate linear positions in the interior of the assembly 200 including, for example, the second position as shown in FIG. 5 wherein the piston/magnet carrier assembly 100 is located entirely in the interior chamber 26 defined by the housing member 22 and the tube 120 is at least partially extended into the interior cavity 28 defined by the dome 29 of the housing member 22. In this second position, the spring 150, which is shown in broken form in FIG. 5 for simplification purposes, is compressed.

A decrease in the vacuum in the tube 31 and thus an increase in the air pressure in the interior of the assembly 200 and, more specifically, the interior cavities 26 and 212 defined by the respective housing members 22 and 210, causes the piston/magnet carrier assembly 100 to move linearly downwardly in the chamber or cavity 212 from its second position as shown in FIG. 5 back to its biased first position of FIG. 2 wherein the plate 336 coupled to the bottom of the piston/magnet carrier assembly 100 is abutted against the top of the wall 223 of the housing member 210 and the spring 150 is in its fully extended position.

Piston/magnet carrier assembly 100 thus is capable of moving linearly in the interior of the assembly 200 with respect to the Hall Effect sensor 82 which is located inside the pocket 40 in a generally opposed, adjacent, and isolated relationship relative to the magnet 140. The sensor 82 is spaced, separated, and isolated from the magnet 140 by the pocket wall 36. The magnetic field produced by the magnet 140 passes through the wall 36 where the magnitude and/or direction of the magnetic field is sensed by the sensor 82. As the magnet 140 moves linearly in the interior of the assembly 200 relative to the sensor 82, the north and south poles change position relative to the sensor 82 thus creating a change in the magnitude and/or direction of the magnetic field. The changes in the direction and/or magnitude of the magnetic field can be sensed about two axes by the sensor 82.

Sensor 82 produces an electrical signal that changes in response to the position of the magnet 140 and thereby also a change in the position of the shaft 270. The electrical signal produced by the sensor 82 is indicative of the position of the magnet 140 and the piston/magnet carrier assembly 100. As the magnetic field generated by the magnet 140 varies with the movement of the shaft 270, the electrical output signal produced by sensor 82 changes accordingly, allowing the position of the shaft 270 and thus the object coupled thereto to be determined.

Further, and as shown in FIG. 5 which depicts the piston/magnet carrier assembly 100 in its fully extended linear position within the cavity 26 of the housing member 22, it is understood that the piston/magnet carrier assembly 100 is also adapted for see-saw, tilting, up and down type movement in response to a tilting, back and forth movement of the shaft 270 which, in turn, allows for the tilting, side to side movement of the tube 120.

FIGS. 9 and 10 depict a first alternate simplified embodiment of a magnet assembly 1140 which, in accordance with the present invention, can be substituted for the magnet assembly 140 shown in FIGS. 2, 3, and 5.

The cost of non-contacting position sensors is dependent in part upon the cost of each of the constituent parts thereof including the cost of the magnet assemblies thereof which, in turn, is dependent upon the cost of the material of the magnet 140 which is made entirely from NdFeB (neodymium/iron/boron) or a like high strength magnetic material. NdFeB and other like high strength magnetic materials are, however, relatively high cost materials when compared to, for example, other magnetic materials such as, for example, iron or steel.

In the magnet assembly 1140, one or more of the portions thereof has been substituted with one or more pole pieces or portions composed of iron or steel or another like low cost ferromagnetic material as discussed in more detail below.

More specifically, in FIGS. 9 and 10, the magnet assembly 1140 is in the form of an elongated cylinder and comprises a central cylindrically-shaped magnet portion 1120 made of NdFeB or the like high strength magnetic material and opposed cylindrically-shaped end pole pieces or portions 1122 and 1124 which have been coupled and stacked onto the respective opposed ends of the central portion 1120 and are comprised of any suitable lower cost ferromagnetic material capable of conducting and directing magnetic fields such as, for example, iron or steel. In the embodiment shown, pole pieces 1122 and 1124 are equal in length to each other but shorter in length than the central magnet portion 1120.

As shown in FIG. 10, the magnet assembly 1140 of FIG. 9 allows the generation of a magnetic flux field 1116 which extends internally through the interior of both the central NdFeB magnet portion 1120 and the two end pole pieces or portions 1122 and 1124 and then externally in a generally radial pattern which extends and travels through the Hall effect sensor 82 which, as described earlier above, is adapted to sense at least the direction/polarity/phase angle of the magnetic flux 1116 to produce an electrical signal which is dependent upon the polarity/direction/phase angle of the magnetic flux field 1116.

Thus, the use of end pole pieces or portions 1122 and 1124 made of a low cost magnetic material advantageously increases the effective length of the magnet 1140 and thus the effective path and strength of the magnetic flux field 1116 both internally and externally of the magnet assembly 1140 in a package which is lower in cost than currently available magnet assemblies.

FIG. 11 depicts a second alternate embodiment of a magnet assembly 2140 which comprises a central elongated, generally cylindrically-shaped pole piece or portion 2130 made of any suitable ferromagnetic material such as, for example, iron or steel and two end magnet pieces or portions 2132 and 2134 which have been coupled and stacked onto opposed distal ends of the central pole piece 2130 and are each made of NdFeB or the like high strength magnetic material. In the embodiment shown, each of the end magnet pieces or portions 2132 and 2134 has the same length but has a length which is less than about one half the length of the central pole piece or portion 2130.

FIG. 12 depicts yet another alternate embodiment of a magnet assembly 3140 which comprises two elongate generally cylindrical portions which have been coupled and stacked together end over end, i.e., a magnet portion 3240 made of NdFeB or the like high strength magnetic material and a pole piece or portion 3243 made of any suitable lower cost ferro-magnetic material such as iron or steel. In the embodiment shown, each of the portions 3240 and 3243 has the same length.

Although not described in detail herein, it is understood that the magnet assemblies 2140 and 3140 are adapted to be displaced linearly in the same up and down direction generally designated Y in FIGS. 11 and 12 and generate magnetic flux fields similar to the magnetic flux field 1116 generated by the magnet assembly 1140 for sensing by the Hall effect sensor 82 (FIGS. 11 and 12) which is positioned in a spaced and parallel relationship to the respective magnet assemblies 2140 and 3140.

Thus, and as described above, the present invention is also directed to an actuator and sensor assembly 200 adapted to use different magnet assembly embodiments, which may be of any desired shape and configuration including cylindrical or square, in which one or more of the magnet portions thereof made of NdFeB or the like high strength but high cost magnetic material have been substituted with one or more respective pole pieces or portions made of a ferromagnetic material such as iron or steel to reduce the overall cost of the magnet assembly without, however, affecting the overall effective length of the magnet, the strength of the magnetic field generated by the magnet assembly, or the performance of the magnet assembly.

While the invention has been taught with specific reference to the embodiment shown, it is understood that a person of ordinary skill in the art will recognize that changes can be made in form and detail without departing from the spirit and the scope of the invention. The described embodiment is to be considered in all respects only as illustrative and not restrictive.

What is claimed is:

1. An actuator and sensor assembly comprising:
   a sensor housing including a wall defining an opening and a pocket and a circumferentially extending skirt;
   a connector assembly including a substrate having a sensor mounted thereon, the connector assembly being coupled over the top of the sensor housing in a relationship wherein the substrate and the sensor extend through the opening and into the pocket defined by the wall of the sensor housing;
   an actuator housing including a base defining a central aperture and a circumferentially extending side wall, one of the skirt of the sensor housing or the side wall of the actuator housing including a plurality of clips and the other of the skirt of the sensor housing or the side wall of the actuator housing including a lip, the plurality of clips engaging against the lip for coupling the sensor housing to the actuator housing, the sensor and actuator housings together defining an interior cavity;
   a flexible diaphragm located in the interior cavity and including a peripheral portion wedged between the skirt of the sensor housing and the side wall of the actuator housing;
   a magnet carrier assembly located in the interior cavity and seated against the flexible diaphragm, the magnet carrier assembly including a receptacle for a magnet, the magnet carrier assembly being adapted for linear movement within the interior cavity from a first position adjacent the base of the actuator housing to a second position away from the base of the actuator housing, the magnet being located opposite, spaced, and isolated from the pocket containing the sensor;
   an actuator shaft including a first end in the interior cavity coupled to the magnet carrier assembly and a second end extending through the aperture in the base of the actuator housing and coupled to a moveable object;
   a spring in the interior cavity extending between the wall of the sensor housing and the magnet carrier assembly, the spring biasing the magnet carrier assembly in the first position adjacent the base of the actuator housing; and
   a pressurization source coupled to one of the sensor housing or the actuator housing for adjusting the pressure in the interior cavity and causing the movement of the magnet carrier assembly, the movement of the magnet carrier causing a change in the magnetic field generated by the magnet which is sensed by the sensor.

2. The actuator and sensor assembly of claim 1 wherein the connector assembly includes a plurality of terminals extending therethrough and an arm, the plurality of terminals extending on the arm and the substrate extending from the arm and being electrically connected to the plurality of terminals, the wall of the sensor housing defining a dome and the connector assembly being seated against the dome.

3. The actuator and sensor assembly of claim 1 wherein the base of the actuator housing defines a first central cavity and a plurality of peripheral second cavities, the actuator and sensor assembly further comprising a gimbal defining a through aperture and a plurality of mounting pins including respective heads, the gimbal being located in the first central cavity defined in the base of the actuator housing and the actuator shaft extending through the aperture of the gimbal, the respective heads of the mounting pins extending into the respective peripheral second cavities defined in the base of the actuator housing.

4. The actuator and sensor assembly of claim 1 further comprising a hollow insert located in the receptacle of the magnet carrier, the first end of the actuator shaft extending through the insert and including a head abutted against the top of the insert.

5. The actuator and sensor assembly of claim 1 wherein the magnet comprises at least first and second stacked portions made of different magnetic materials.

* * * * *